PTU24 XR 4,384,944

United States Patent [19] [11] 4,384,944

Silver et al. [45] May 24, 1983

[54] CARBON FILLED IRRADIATION CROSS-LINKED POLYMERIC INSULATION FOR ELECTRIC CABLE

[75] Inventors: David A. Silver, Livingston; Rudolf G. Lukac, East Brunswick; Solomon Rubinstein, Fanwood, all of N.J.

[73] Assignee: Pirelli Cable Corporation, Union, N.J.

[21] Appl. No.: 299,038

[22] Filed: Sep. 3, 1981

Related U.S. Application Data

[60] Division of Ser. No. 188,529, Sep. 18, 1980, which is a continuation of Ser. No. 14,744, Feb. 23, 1979, abandoned.

[51] Int. Cl.[3] .......... B32B 27/16; C08J 3/28

[52] U.S. Cl. .......... 204/159.13; 204/159.2; 524/496; 428/383; 428/390

[58] Field of Search .......... 204/159.2, 159.13

[56] References Cited

U.S. PATENT DOCUMENTS

| | | | |
|---|---|---|---|
| 3,096,210 | 7/1963 | Boonstra | 174/120 SC |
| 3,133,894 | 5/1964 | Boonstra | 174/110 PM |
| 3,325,325 | 6/1967 | Ward | 174/110 PM |
| 3,529,340 | 9/1970 | Polizzano et al. | 174/110 PM |
| 3,725,230 | 4/1973 | Bahder et al. | 204/159.2 |
| 3,793,476 | 2/1974 | Misiura et al. | 174/120 SC |
| 3,925,597 | 12/1975 | Misiura et al. | 174/120 SC |
| 3,991,397 | 11/1976 | King | 174/120 SC |
| 4,150,193 | 4/1979 | Burns | 174/120 SC |
| 4,303,574 | 1/1981 | Vostovich | 428/390 |

OTHER PUBLICATIONS

Mattiello "Protective & Decorative Coatings" vol. II, Wiley & Sons, 1942 pp. 506, 519.

*Primary Examiner*—John C. Bleutge
*Assistant Examiner*—A. H. Koeckert
*Attorney, Agent, or Firm*—Brooks, Haidt, Haffner & Delahunty

[57] ABSTRACT

Insulation for an electric power cable, and a power cable including such insulation, the insulation having an improved dielectric strength and being irradiation cross-linked polymeric material having mixed therewith carbon black having a particle size in the range from about 200 to about 500 millimicrons, the carbon black content being about 10% to about 40% of the weight of the mixture of carbon black and the polymeric material. Also, the cable insulation may be layers of different density polyethylene, at least one of the layers being the described mixture of polyethylene and carbon black.

4 Claims, 1 Drawing Figure

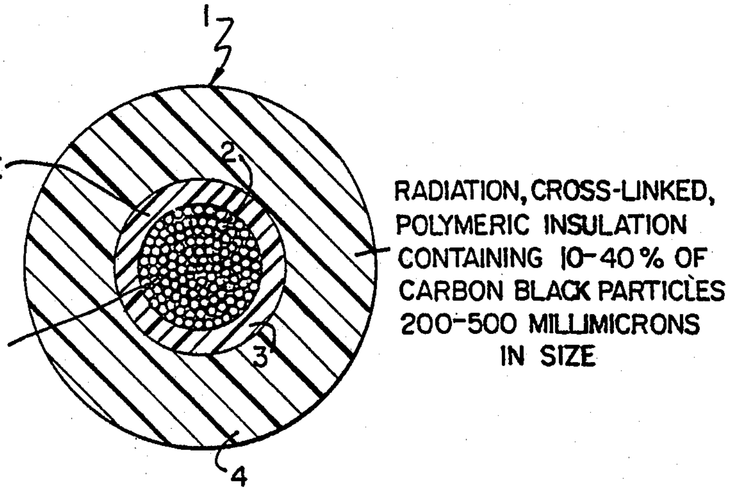
1
INSULATING OR
SEMI-CONDUCTIVE
LAYER
2
CONDUCTOR
3
4
RADIATION, CROSS-LINKED,
POLYMERIC INSULATION
CONTAINING 10-40% OF
CARBON BLACK PARTICLES
200-500 MILLIMICRONS
IN SIZE

CARBON FILLED IRRADIATION CROSS-LINKED POLYMERIC INSULATION FOR ELECTRIC CABLE

This is a division of application Ser. No. 188,529, filed Sept. 18, 1980, which is a continuation of Ser. No. 014,744, filed Feb. 23, 1977, now abandoned.

This invention relates to irradiation cross-linked, polymeric, electrical insulating material and particularly to polymeric insulation of electric cables which has been cross-linked by irradiation.

The use of cross-linked polymeric insulation in electric power cables to produce certain desirable mechanical or electric characteristics is well known in the art. See, for example, U.S. Pat. Nos. 3,325,325; 3,749,817; 3,769,085; 3,387,065; 3,725,230; and 3,852,518. In some cases, the cross-linking is caused by irradiating the polymeric material with high energy electrons.

It is known in the art to incorporate carbon black in cross-linkable polymeric materials for filling or coloring purposes to make such materials semi-conductive. If the cross-linked material is to serve as insulation, it should have a volume resistivity of at least the order of $1\times10^{10}$ ohm-cm. at 23° C. and preferably, $1\times10^{15}$ ohm-cm. at such temperature. To obtain such resistivity, a medium thermal (MT) type of carbon black having a particle size in the range of 200–500 millimicrons usually is mixed with the polymeric material in amounts of up to 2.5% of the total weight of the mixture. When the cross-linked material is to serve as a semi-conducting material, the volume resistivity generally is below $1\times10^{5}$ ohm-cm. at 23° C., and to obtain such resistivity, channel black having a particle size in the range of 20–50 millimicrons usually is mixed with the polymeric material in various amounts, usually in the 30–40% range, depending upon the desired resistivity. In other words, if the cross-linked material is to serve as insulation, relatively small quantities of a relatively coarse carbon black is mixed with the cross-linkable material whereas if the cross-linked material is to be semi-conducting, rather than an insulator, relatively fine channel black is mixed with the cross-linkable material.

It has been discovered that the dielectric strength of irradiation cross-linked, polymeric, insulating material can be increased by a factor of at least two without reducing the volume resistivity thereof below $1\times10^{15}$ ohm-cm. at 23° C. by significantly increasing, the amount of coarse carbon black mixed with the cross-linkable polymeric material prior to its being extruded and subjecting it to radiation. Thus, in accordance with the invention, carbon black having a particle size in the range from about 200 to about 500 millimicrons and in the range of from about 10% to about 40% of the weight of the mixture of carbon black and polymeric material is mixed with the cross-linkable, polymeric material prior to its being extruded and subjecting it to irradiation.

While not purporting to explain fully the reason for the significant improvement in the dielectric strength, it is believed that the increase in the amount of coarse carbon black, as compared to the amount normally used for filling or coloring purposes, substantially increases the diffusion of the electrons as they traverse the cross-linkable material and thereby minimizes the development of electron tracks or "trees". Such tracks or trees affect the dielectric strength of the insulating material, larger or more numerous trees reducing the dielectric strength. Amounts of such carbon black up to 40% of the total weight of the mixture of carbon black and polymeric material do not reduce the volume resistivity of the cross-linked material below $1\times10^{10}$ ohm-cm. whereas larger amounts adversely affect the insulating properties of the cross-linked material. Preferably, the coarse carbon black content is about 20 to 30% of the weight of the mixture of the two. The carbon content of the irradiated insulating material is the same as the carbon content of the material prior to irradiation.

One object of the invention is to provide a radiation cross-linked, polymeric insulating material which has a dielectric strength which is substantially higher than the dielectric strength of similarly irradiation cross-linked, prior art, insulating materials.

A further object of the invention is to provide an electric power cable having a conductor which is insulated by one or more layers of an irradiation cross-linked, polymeric material which has an improved dielectric strength as compared to prior art cables with a conductor similarly insulated.

Other objects and advantages of the invention will be apparent to those skilled in the art from the following description of preferred embodiments thereof which description should be considered in conjunction with the accompanying drawing which illustrates in cross-section, an electric cable comprising at least one layer of the irradiated, cross-linked, polymeric insulation of the invention.

The single FIGURE of the drawing illustrates a single conductor, electric power cable 1 having a central conductor 2 with a pair of layers 3 and 4 extending therearound. The conductor 2 may be stranded as shown or may be a solid conductor, and although only a single conductor cable 1 is shown, the invention is equally applicable to the insulation of multiconductor cables.

At least one of the layers 3 and 4 is a layer of insulating polymeric material having the composition of the invention, that is, it is a radiation cross-linked, polymeric material with a volume resistivity of at least $1\times10^{10}$ ohm-cm. and containing carbon black having a particle size in the range of 200–500 millimicrons and in an amount, by weight, in the range of 10–40% of the total weight of the polymeric material and carbon black. Preferably, the carbon black is a carbon black known commercially as a "medium thermal" type. Although carbon black having a particle size outside the range of 200–500 millimicrons may also be present in small amounts, the amount of carbon black having a particle size smaller than 200 millimicrons must be less than an amount which will cause the volume resistivity to be less than $1\times10^{10}$ ohm-cm. The polymeric material may be any of the known materials which are cross-linkable by radiation treatment and may, for example, be polyethylene, polyvinyl chloride, silicone rubber, styrene butadiene rubber, ethylene copolymers including ethylene propylene rubber, ethylene terpolymers, mixtures of such polymers, etc.

Preferably, the carbon black is present in an amount of 20–30% by weight and most preferably, in an amount of about 28% and the volume resistivity of the insulating layer is at least $1\times10^{15}$ ohm-cm.

In a preferred embodiment of the cable of the invention, both of the layers 3 and 4 are made of the irradiated, cross-linked polymeric material of the invention, and for example, the layer 3 may be low density polyethylene and the layer 4 may be either high density or medium density polyethylene, each layer containing carbon black in the amounts and of the particle size described. However, one of the two layers 3 and 4 may be of a different material, and if desired one of the two layers 3 and 4 may be omitted, the remaining layer being of the irradiated cross-linked polymeric material of the invention. As used herein, the terms "low", "medium" and "high" density polyethylene refer to the ASTM Type I, Type II and Type III standards, namely, low density polyethylene has a density from about 0.910 to about 0.925 gms/cm$^3$, medium density polyethylene, about 0.926 to about 0.940 gms/cm$^3$ and high density polyethylene, about 0.941 to 0.965 gms/cm$^3$.

Alternatively, the layer 3 may be semi-conductive layer, such as a layer of radiation cross-linked, polymeric material, having a volume resistivity of $1\times10^5$ ohm-cm. or less, for conventional stress distribution purposes, and the layer 4 would be a layer of the radiation cross-linked, polymeric material of the invention.

Of course, the cable 1 may have additional layers of various materials either intermediate a layer 4 made of the insulating material of the invention and the conductor 2 or externally of the layer 4, e.g. an armoring or shielding layer. In other words, the insulating material of the invention may be used as electrical insulation wherever such is required.

The insulating material of the invention may be prepared by prior art processes and may include, in addition to the carbon black and the polymeric material, other materials conventionally employed in making radiation cross-linked, polymeric, insulating materials. In the manufacture of an electric cable, such as the cable 1, one or more layers of the prepared polymeric material are extruded separately or simultaneously over the conductor 2 in a conventional manner, and thereafter, the layer or layers of the material are subjected to radiation in the appropriate doses and as required to produce the cross-linking, such as is described in said patents.

Although preferred embodiments of the present invention have been described and illustrated, it will be understood by those skilled in the art that various modifications may be made without departing from the principles of the invention.

What is claimed is:

1. An electrical insulator comprising a radiation cross-linked, polymeric material with carbon black distributed therein, the amount and particle size of the carbon black which is present in the polymeric material being such that the volume resistivity of said insulator is at least $1\times10^{10}$ ohm-cm., the carbon black having a particle size in the range from about 200 to about 500 millimicrons and being present in the polymeric material in an amount of about 10% to about 40% of the total weight of the polymeric material and the carbon black having a particle size in said range, said insulator being distinguished from other insulators comprising said radiation cross-linked, polymeric material with carbon black therein in particle sizes and amounts different from particle sizes in said range and in said amount not only by having a resistivity of at least $1\times10^{10}$ ohm-cm. but also having a greater dielectric strength and a reduction in at least one of the number and of the size of electron trees therein as compared to such other insulators having lesser amounts of said carbon black.

2. An electrical insulator as set forth in claim 1 wherein said volume resistivity of said insulator is at least $1\times10^{15}$ ohm-cm. and said carbon black having a particle size in said range is present in an amount from 20–30%.

3. An electrical insulator as set forth in claim 2 wherein substantially all the carbon black which is present in said polymeric material has a particle size in the range from 200–500 millimicrons.

4. An electrical insulator as set forth in claim 1, 2 or 3 wherein said polymeric material is selected from the group consisting of polyethylene, polyvinyl chloride, silicone rubber, styrene butadiene rubber, ethylene copolymers, ethylene terpolymers, and mixtures thereof.

* * * * *

4384944 U 23 083
DUBOSE / BOX 711
ACCESSION #58-165
CRYSTAL SQUARE 4 * 105-G07
2 STAPLES AT BOTTOM
08150815 ZIP:
08/15 TL X063